Sept. 13, 1932.                M. H. ST. CLAIR                 1,877,702
                      SNAP HOOK FOR PARACHUTE HARNESS
                           Filed Sept. 25, 1931

M. H. St Clair INVENTOR
BY Victor J. Evans
ATTORNEYS

Patented Sept. 13, 1932

1,877,702

UNITED STATES PATENT OFFICE

MILTON H. ST. CLAIR, OF TRENTON, NEW JERSEY, ASSIGNOR TO THE SWITLIK PARACHUTE AND EQUIPMENT COMPANY, INC., OF TRENTON, NEW JERSEY, A CORPORATION OF NEW JERSEY

SNAP HOOK FOR PARACHUTE HARNESS

Application filed September 25, 1931. Serial No. 565,178.

The present invention relates to the art of hooks and particularly to an improved snap hook for use in connection with parachute harness.

In the majority of snap hooks, the tensioned snap is usually carried by the base or body of the hook, rendering it difficult to connect the ring to the hook and substantially less difficult to disengage the ring from the hook.

It is therefore the purpose of the present invention to provide a snap hook for parachute harness, wherein the tensioned snap is so mounted that the engagement of the ring with the hook is comparatively easy, requiring but a second to slide the ring past the snap, and when so engaged, the disconnection of the ring is extremely difficult.

Another purpose is to provide a snap hook, wherein the tensioned snap is carried by the terminal of the overhanging arm of the hook, the snap being capable of opening movement in a direction toward the loop end of the hook as well as toward the overhanging arm, so that a ring may very easily slide past the snap, and yet be prevented from movement in the opposite direction, after the snap restores to its initial position.

Another purpose is to provide, in a snap hook, a tensioned snap so pivotally mounted and guided on the terminal of the overhanging arm, as to prevent lateral movement of the snap, thereby preventing the snap from getting out of order from constant use, which is usually the case with the ordinary snap hook, where the tensioned snap moves in a direction away from the terminal of the overhanging arm rather than toward said arm.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1:
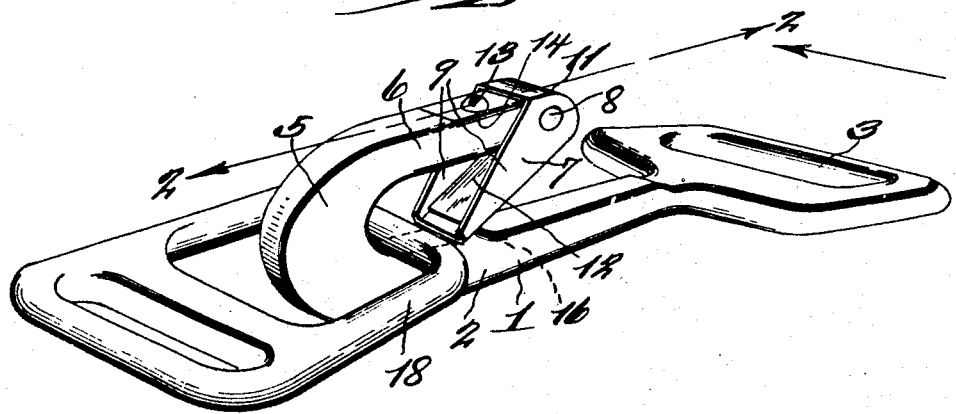
Figure 1 is a perspective view of the improved snap hook constructed in accordance with the invention, and showing the ring connected thereto.
Figure 2:
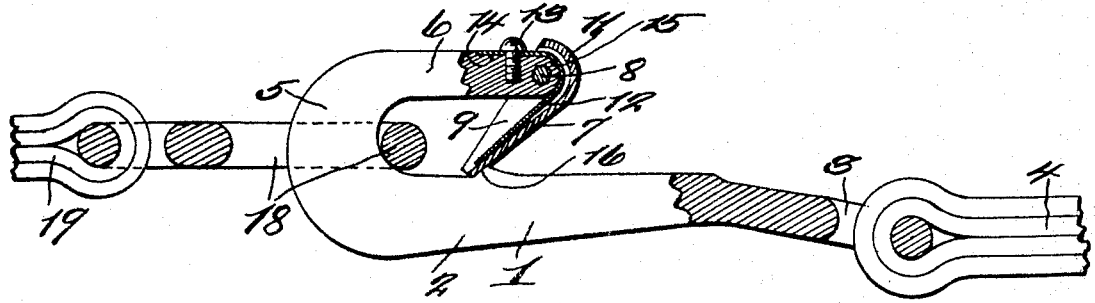
Figure 2 is a sectional view on line 2—2 of Figure 1, showing the tensioned snap as having been actuated to allow the ring to pass same.

Referring to the drawing 1 identifies the snap hook as a whole comprising the body 2 having a transversely elongated eye 3 at one end for connection to a strap 4. The other end of the body merges into a loop 5 having an arm 6, which overhangs the body of the hook. A tensioned snap 7 is pivoted at 8 on the terminal of the arm, and which snap constitutes a tongue. The snap or tongue in side elevation is V shaped and of channel formation, and due to the snap being V shaped or wedge shaped and channeled it has sides 9, through the larger portions of which the pivot pin 8 (the ends of which are swaged or peened over as shown at 10 to hold the pivot pin in place). The bottom of the channel of the snap merges into a curved wall 11 at the larger end of the snap, and which overlies the curved terminal of the arm.

A leaf spring 12 is secured to the arm at 13 in a slight depression 14, and curves around the end of the arm as identified at 15 and is seated against the bottom of the channel. This leaf spring tensions the snap or tongue so as to hold it normally in engagement with a shoulder 16 formed on the elongated portion of the body of the hook.

The snap or tongue normally engages the elongated portion of the body of the hook and lies in an inclined direction and during its opening movement for the admission of the ring 18, it moves toward the overhanging arm of the hook, that is substantially in a direction toward the loop of the hook. When the snap or tongue moves in such direction for the admission of said ring, the distance of movement is just sufficient to allow the thickness of the ring to pass, and when the ring is engaged with the loop it is very difficult to disengage the ring from the hook. It is obvious from an inspection of the drawing that it is comparatively easy and will require hardly any more than a second to engage the ring with the snap hook, that is to say to move the ring past the snap or tongue. The ring may be connected to another strap identified at 19, which may constitute a part of a parachute harness.

While this snap hook has been set forth as particularly adapted for parachute harness, it is obvious that it may be used with equal efficiency in connection with many other straps, for instance in connection with animal harness, baggage harness and many other straps.

The invention having been set forth, what is claimed is:

1. As an article of manufacture, a snap hook comprising a body having a loop at one end and merging into an arm beyond the loop, the arm being substantially straight and parallel to the body of the hook, said arm having a rounded terminal, a tongue snap hollowed to form a shell having a rounded wall to conform to the rounded terminal of the arm, the outer surface of the wall being free and unobstructed, thereby preventing the tongue snap from being actuated by an element in its path, said tongue snap being tapered toward the body of the hook, the larger end of the snap fulcrumed on and housing the terminal of the arm and tensioned to move to a closed position toward the body of the hook and adapted to be moved against its tension to an open position toward the arm permitting passage of a ring to be engaged into the loop of the hook, and means comprising the sides of the snap for guiding the tongue snap during its movement, thereby preventing lateral displacement of the tongue snap.

2. As an article of manufacture, a snap hook comprising a body with a loop at one end and merging into a returned arm substantially straight and parallel with the body of the hook, the terminal of the arm being rounded, a leaf spring secured to an outer remote face of the arm bent over and conforming to the rounded terminal, a tongue snap of wedge formation and hollowed to form a shell, the larger end of the wedge shaped shell being rounded to conform to the rounded portion of the leaf spring where it fits the rounded terminal, the leaf spring engaging within the greater portion of the length of the tongue snap to normally retain it against the body of the hook, the side walls of the shell form tongue snap acting to prevent lateral movement of the leaf spring where it engages within the shell, the outer surface of the wall at the larger end of the shell being free and unobstructed, thereby preventing the tongue snap from being actuated by an element in its path.

In testimony whereof I affix my signature.

MILTON H. ST. CLAIR.